Jan. 10, 1928.

E. A. KAUFFMAN

AEROPLANE

Filed Feb. 17, 1926

Inventor
Elias A. Kauffman
by J. Daniel Stuwe
Attorney

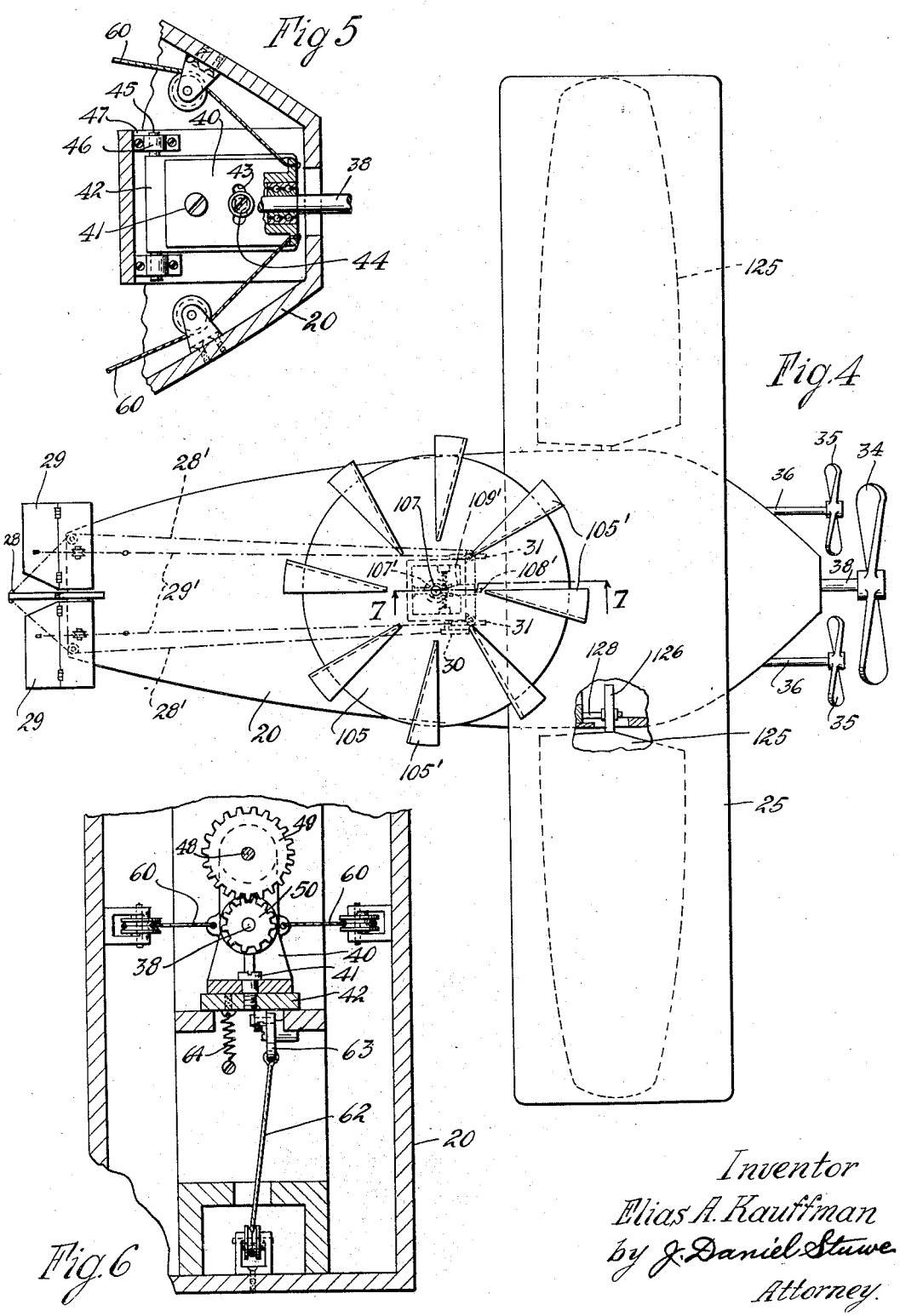

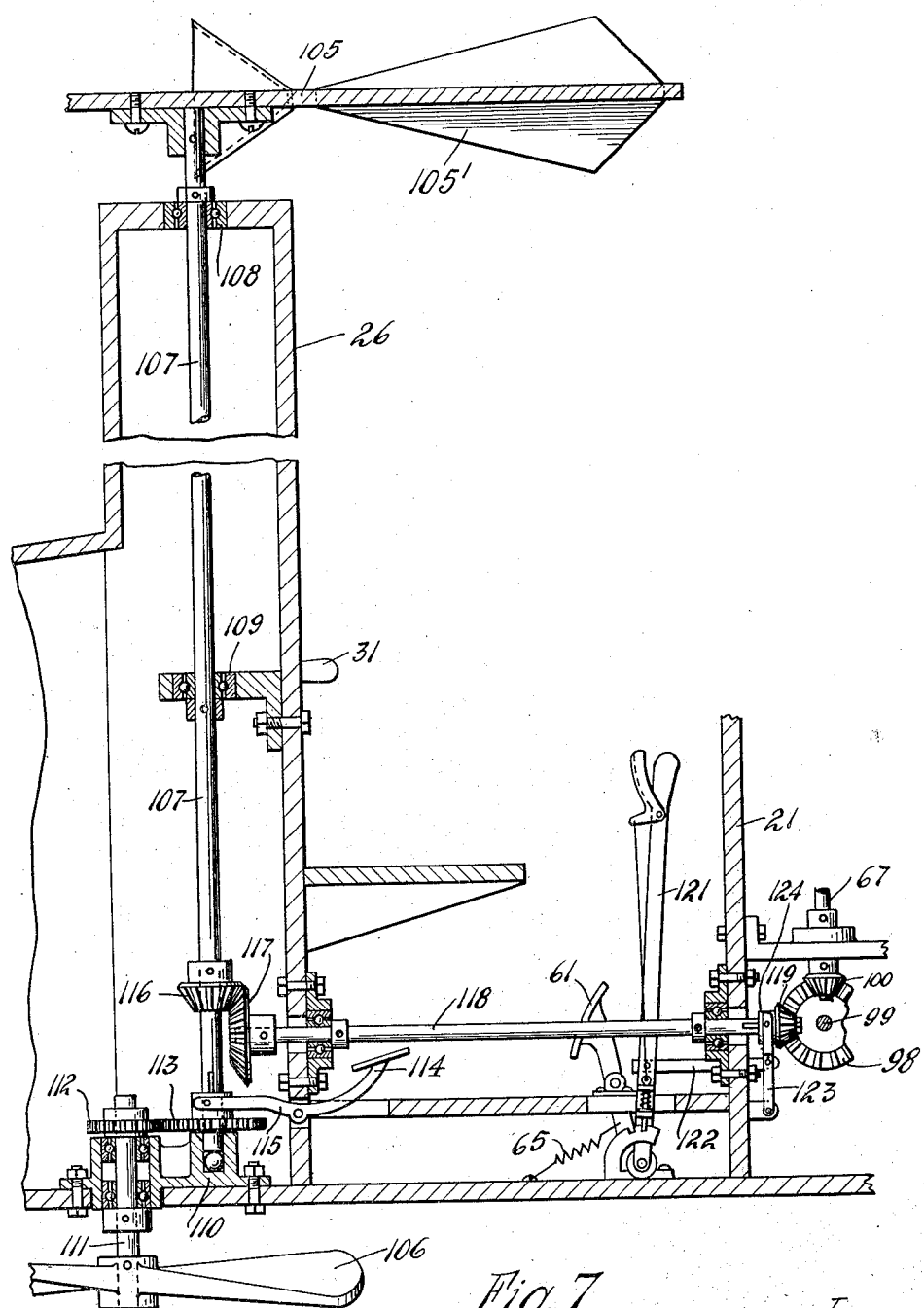

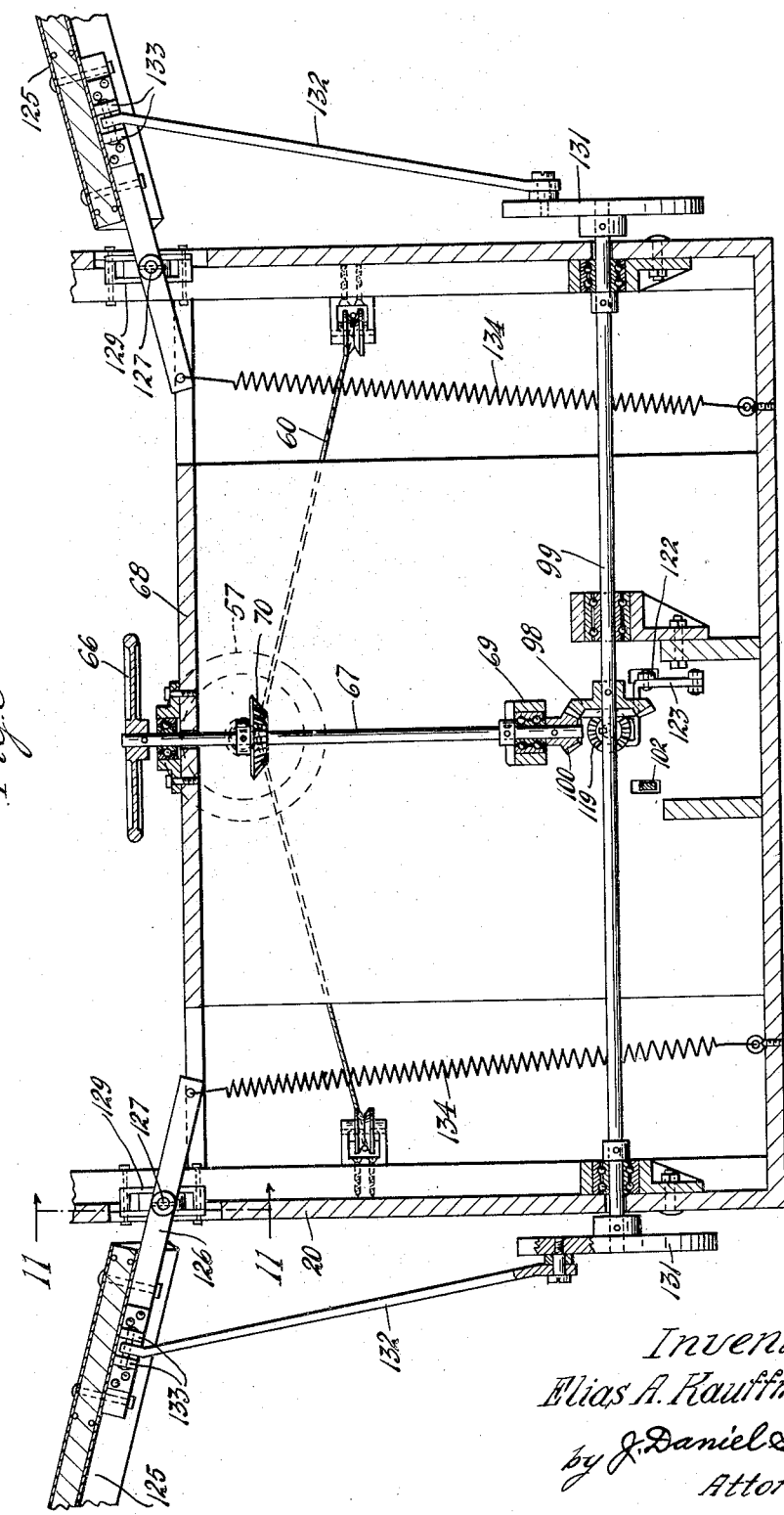

Jan. 10, 1928.

E. A. KAUFFMAN

AEROPLANE

Filed Feb. 17, 1926

Inventor
Elias A. Kauffman
by J. Daniel Stauve
Attorney.

Jan. 10, 1928.  1,655,704
E. A. KAUFFMAN
AEROPLANE
Filed Feb. 17, 1926   8 Sheets-Sheet 8

Inventor
Elias A. Kauffman
by J. Daniel Stuwe
Attorney.

Patented Jan. 10, 1928.

UNITED STATES PATENT OFFICE.

ELIAS A. KAUFFMAN, OF CHICAGO, ILLINOIS.

AEROPLANE.

Application filed February 17, 1926. Serial No. 88,757.

My invention relates to aeroplanes, and one of the main objects is to provide an aeroplane with means for driving its propellers by hand, in case the driving engine or motor fails or ceases to function properly, so as to prevent any accidental dropping of the aeroplane. Another object is to provide a plurality of variously arranged propellers, and lever means for placing different ones of said propellers, in or out of operation, so as to operate either a few or many of said propellers either by the engine or by hand. A further object is to provide an aeroplane with a combination driven and driving wheel or member, which serves as a propeller driven by the engine and is also separable from the engine and acts as a wind driven wheel for driving a helicopter propeller and tractor propellers. Another object is to provide a tractor propeller with mounting and operating means for tilting and shifting the propeller with its shaft in order to employ said propeller for steering in the desired direction. A further object is to provide an aeroplane with movable wings and with means for moving or flapping said wings like those of a bird. And another object is to provide a ground engaging brake member or bar for quickly stopping the aeroplane on the ground.

Other objects and advantages are accomplished with my invention as will become apparent from the following description taken in connection with the accompanying drawings, in which, Fig. 1 is a side elevation of an aeroplane embodying my invention in its preferred form;

Fig. 4 is a plan view of my invention;

Figure 1:
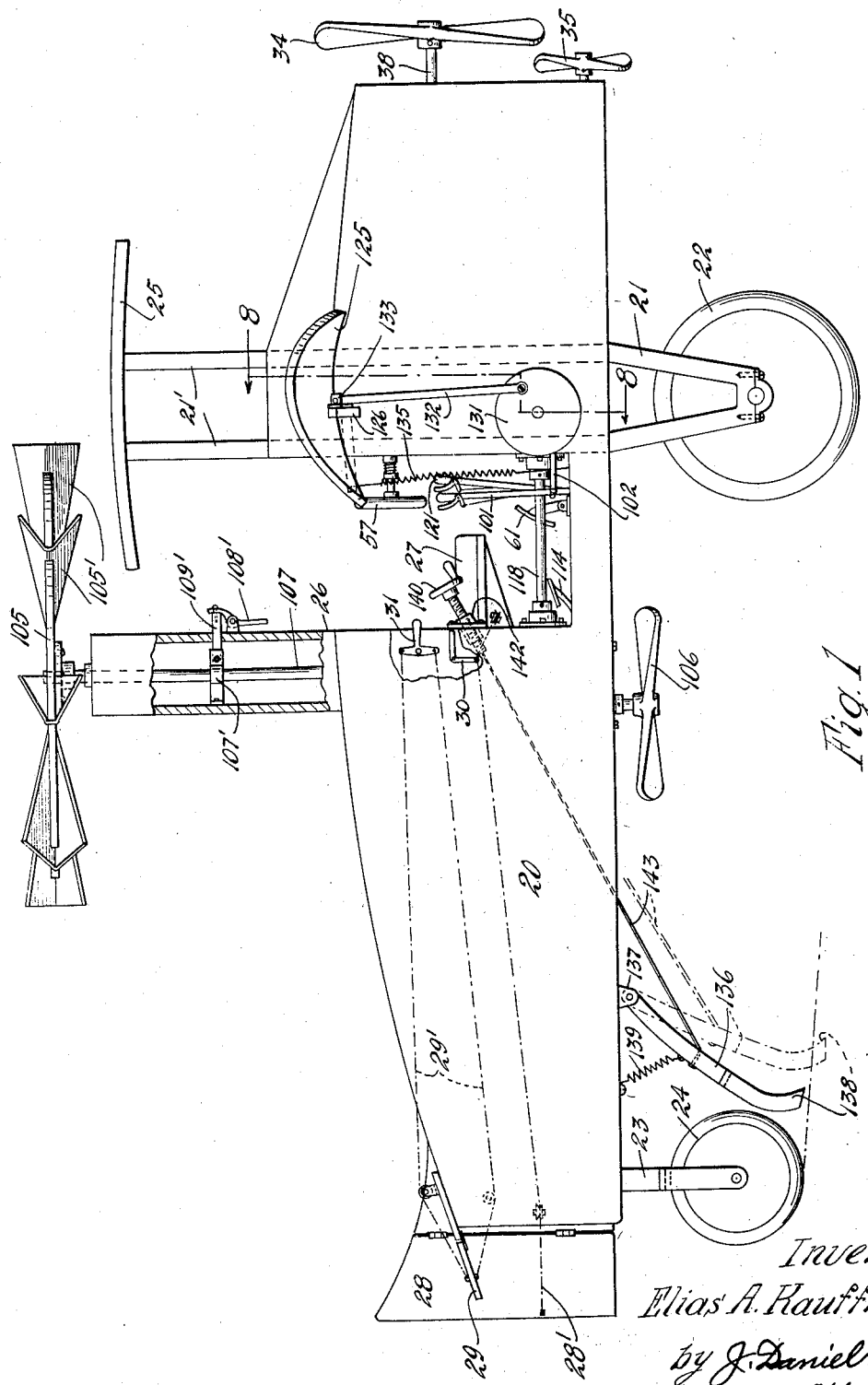
Figure 2:
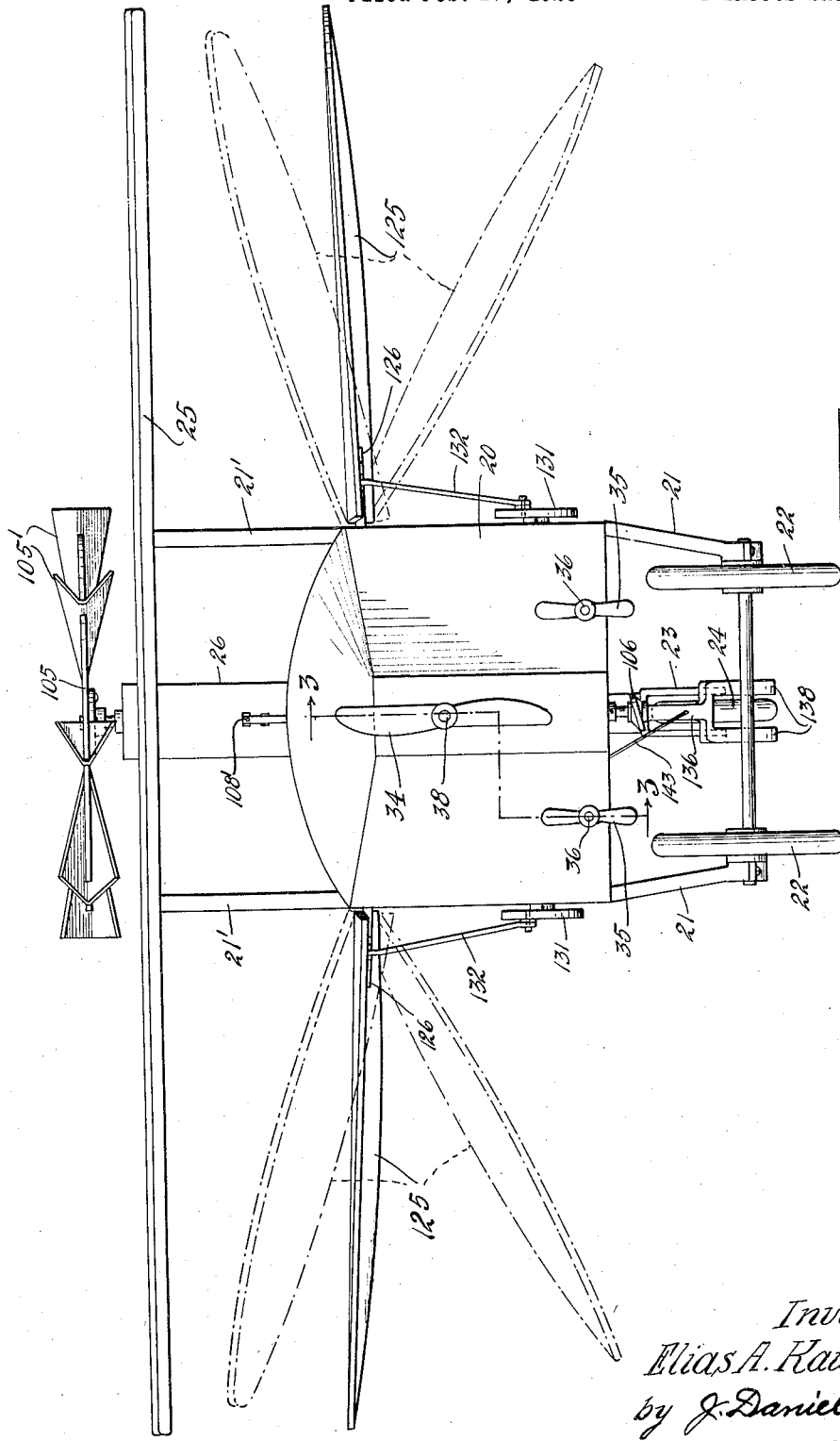
Fig. 2 is a front elevation thereof.
Figure 3:
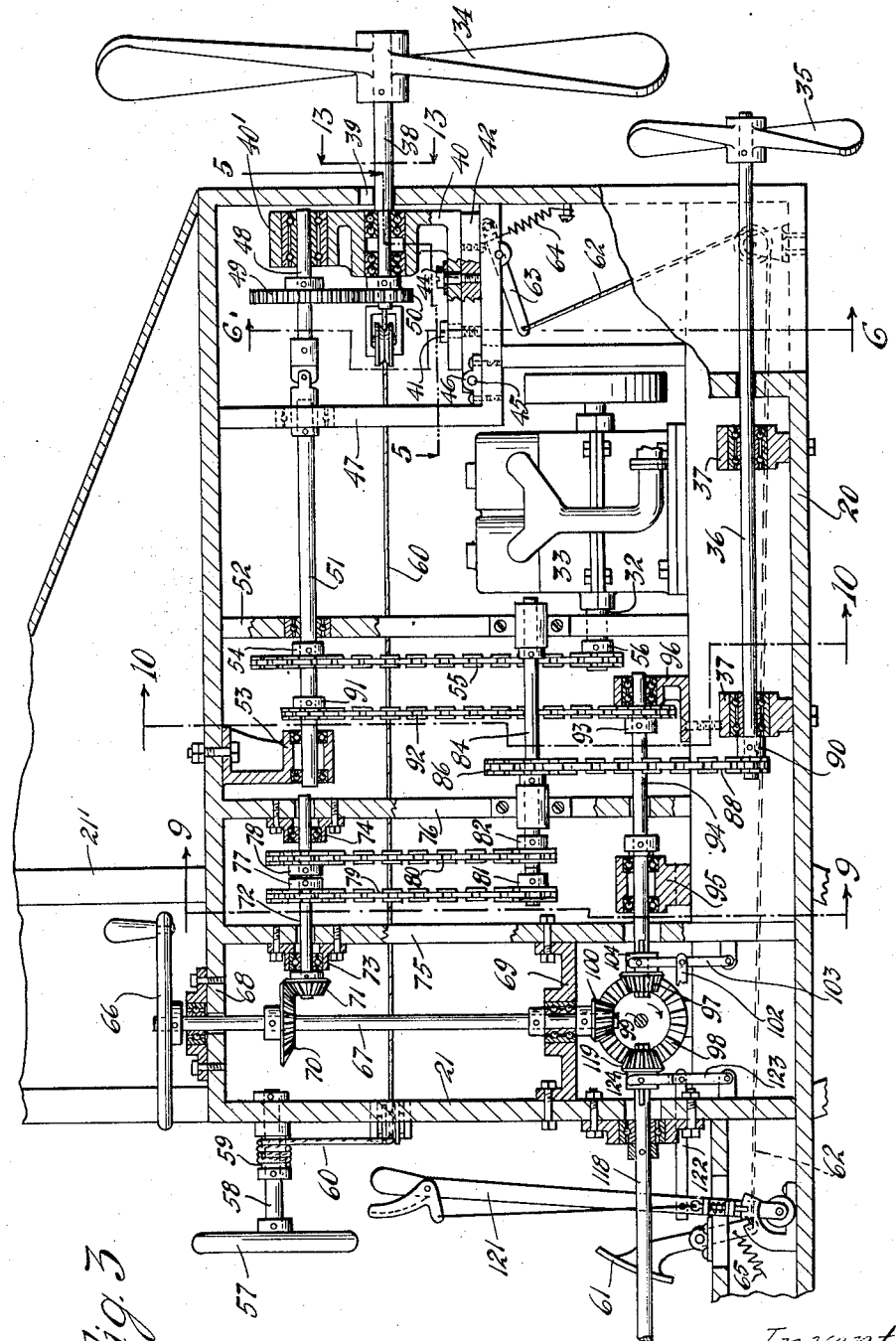
Fig. 3 is an enlarged longitudinal section on line 3—3 of Fig. 2.
Figure 9:
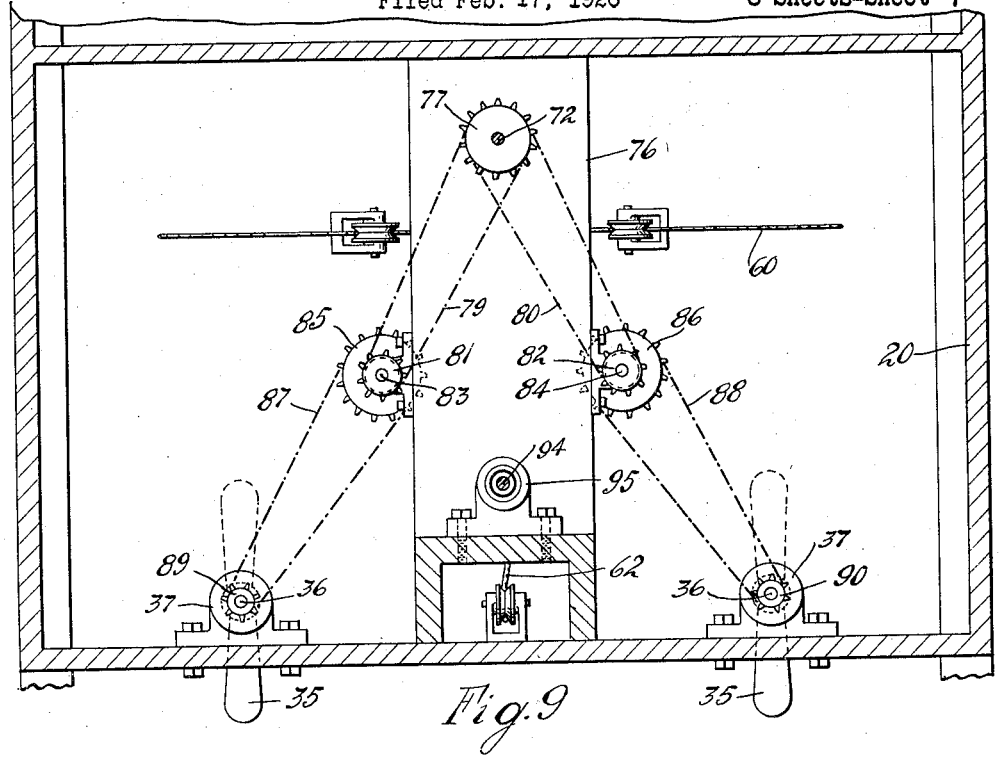
Figure 10:
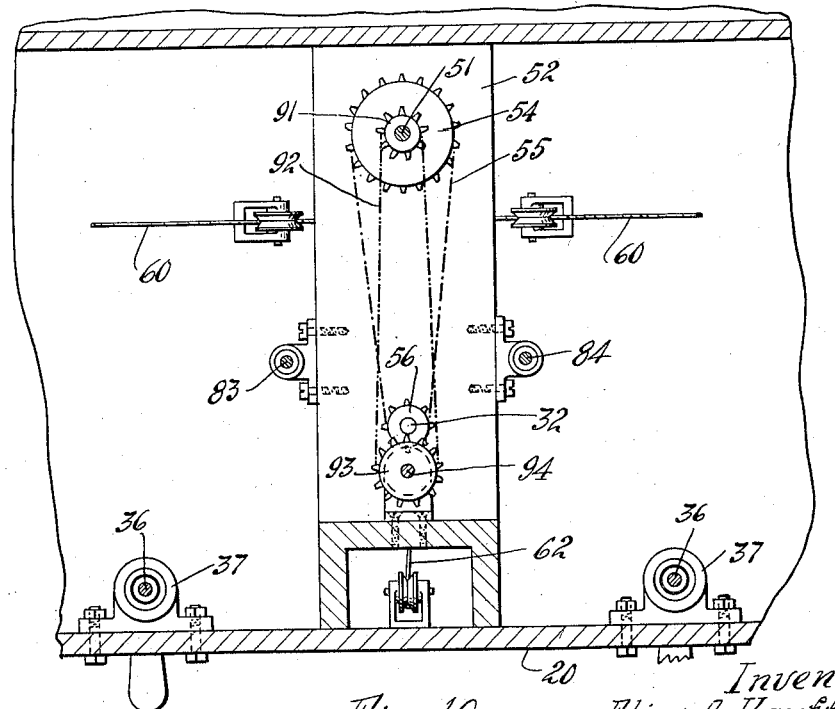
Figure 11:
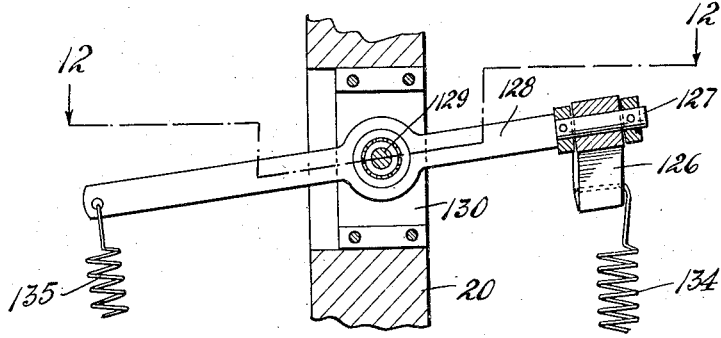
Figure 12:
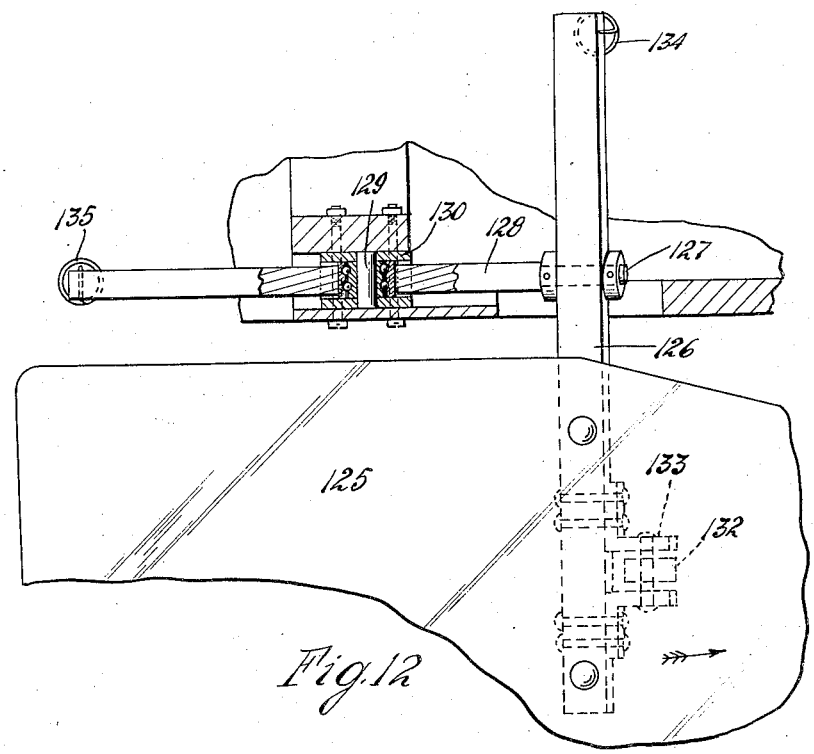
Figure 13:
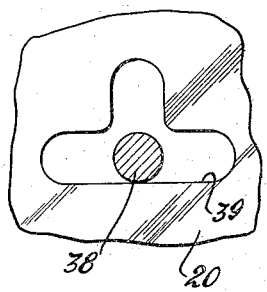

Figs. 5 and 6 are horizontal and vertical sections, respectively, on lines 5—5 and 6—6 of Fig. 3;

Fig. 7 is an enlarged vertical section on line 7—7 of Fig. 4;

Fig. 8 is an enlarged vertical cross-section on line 8—8 of Fig. 1;

Figs. 9 and 10 are vertical cross-sections on lines 9—9, and 10—10 of Fig. 3;

Fig. 11 is an enlarged vertical section on line 11—11 of Fig. 8;

Fig. 12 is an enlarged horizontal section on line 12—12 of Fig. 11; and,

Fig. 13 is an enlarged detail section on line 13—13 of Fig. 3.

In the drawing I have illustrated the preferred form of construction embodying my invention, and comprising a body or fuselage 20 provided with landing gear struts or brackets 21 carrying the front wheel 22 thereon, and a rear bracket 23 carrying the rear wheels 24 thereon, forming the usual landing gear.

The struts 21 are extended upward to form the wing struts 21' carrying the stationary wing or plane 25, of suitable size and outline. The body also contains a pilot's space having a vertical frame or standard 26 at its rear, and a seat 27 mounted thereon for the driver or pilot. A vertical rudder 28 and horizontal rudders 29 are also provided. The rudder 28 is operated by a lever 30, and rudders 29 are each operated by a lever 31, all mounted on frame 26, and suitable cables or means 28' and 29' connect said levers and rudders.

The novel features of my invention include a plurality of tractor propellers all of which are normally driven through the shaft 32 of the engine of motor 33 which is of any approved kind and type, and some of these propellers are operated by hand, in case the engine fails to function properly. These propellers preferably include a main tractor propeller 34, and two auxiliary tractor propellers 35, all mounted at the front of the body. These propellers 35 are mounted on shafts 36 rotatably supported in brackets 37 with anti-friction bearings.

The main propeller 34 is arranged to be moved or tilted in various directions for steering the aeroplane as well as propelling it, and this arrangement is preferably effected by mounting it on a shaft 38 which is movable vertically and laterally or transversely in slot 39 in the front of the body. The shaft is rotatably supported in anti-friction bearings provided in bracket 40 which is mounted to swing on a pivot pin 41 mounted on plate 42, (see Figs. 3 and 5); while a slot 43 in the bracket and a pin 44 on the plate, extending through said slot, limit the lateral movement of said bracket. Said plate is mounted on a horizontal shaft 45, seated in ears 46 provided on frame 47 in the front of the body 20, to provide vertical swinging movement to said plate and the propeller. A shaft 48 is mounted in antifriction bearings in the upper part 40' of the bracket and carries a gear 49 engaging a pinion 50 on propeller shaft 38 for driving the propellers. Shaft 48 has universal connection with a shaft 51 mounted in antifriction bearings in bracket members 47, 52 and 53, and has a slight sliding movement therein to compensate for the tilting and swinging of shafts 38 and 48. A sprocket 54 on said shaft 51 is driven by a chain 55 and by a sprocket 56 on engine shaft 32. Said connected shafts 48 and 51 form the main drive shaft.

The operating means for tilting or swinging the main propeller with its shaft laterally or transversely of the aeroplane comprises a hand wheel 57 with a shaft 58 mounted in struts 21 and having a collar or part 59 on which a cable is fastened with several coils. This cable extends over suitable pulleys and has its front ends fastened to the front corners of bracket 40, for swinging it on its pivot 41. The operating means for swinging or tilting this propeller vertically includes suitable manual operating means, like a pedal 61, with a cable 62 extending to a lever 63 fulcrumed on frame 47 and pivoted on the front end of plate 42 for raising it on its pivot shaft 45. A spring 64 returns lever 63, and a spring 65 returns pedal 61, with propeller shaft 38, to normal position.

The auxiliary propellers 35 may be driven either by hand or by the engine 33. The means for driving them by hand includes a hand wheel 66 on a vertical shaft 67 mounted in suitable bearings on brace bars or members 68 and 69 on the body 20, and a bevel gear 70 pinned on said shaft 67 which drives a bevel pinion 71 on a shaft 72 rotating in bearing brackets 73 and 74 mounted on vertical brace bars or members 75 and 76. Sprockets 77 and 78 are fastened on shaft 72 and drive chains 79 and 80 and thereby sprockets 81 and 82 fastened on shafts 83 and 84 which are mounted in suitable bearing brackets in vertical bars or members 76 and 52. To increase the speed of rotation of propellers 35, large sprockets 85 and 86 are mounted on shafts 83 and 84, and through chains 87 and 88 drive smaller sprockets 89 and 90 fastened on shafts 36 of said propellers.

The means for driving the auxiliary propellers by the engine includes the described motion transmitting members 51 to 56, and a sprocket 91 driving a chain 92 which drives a sprocket 93 and therewith a shaft 94 supported in bearing brackets 95 and 96, and having a bevel pinion 97 slidably mounted at its end to rotate therewith and to be moved into engagement with a bevel gear 98 mounted on a shaft 99 and driving a bevel pinion 100 on shaft 67 of the hand wheel 66.

Means is provided for connecting and disconnecting the engine with the auxiliary propellers, and this means includes a hand lever 101 pivoted to the body 20 and connected by a link 102 to a lever 103 which is pivoted to a lug on vertical bar 75 and has its upper forked end engaging in a groove in collar 104 on bevel pinion 97, for sliding said pinion on shaft 94.

It is apparent from the above that the auxiliary propellers may be driven by the hand wheel 66 (see Figs. 1 and 3) through the shafts 67, 72, 83, 84 and 36, with the connecting gear means and chains thereon; and may also be driven by the engine through the shafts 32, 51, 94, 67, 72, 83, 84 and 36, with the connecting gear means and chains thereon; and that the engine may be connected to or disconnected from the propellers by manipulating hand lever 101.

A main driving wheel 105 is provided which serves a double purpose, and is arranged so that it may be driven by the engine to function as a propeller, and which may be disconnected from the engine by means of levers 101 and 103 and used for driving the auxiliary propellers 35, or may be connected to a helicopter propeller 106 in order to function as a driving wheel driven by the wind to drive either propellers 35 or 106, or both, and thereby move the aeroplane forward and upward. This driving wheel 105 may be constructed with a disk and channel-shaped vanes 105' thereon, which forms connecting and strengthening webs for said vanes, and this wheel is fastened on a shaft 107 rotating in bearings 108 and 109 provided on the vertical frame 26. Said shaft is preferably supported on a ball bearing provided in a bracket 110 fastened on the floor of body 20. The helicopter propeller 106 is mounted on a short shaft 111 rotatably supported in anti-friction bearings in bracket 110, and carrying a pinion 112 engageable by a gear 113, which is mounted to slide on shaft 107 but to rotate therewith. A pedal or lever 114 with an arm or connecting means 115 is provided for connecting and disconnecting gears 112 and 113, to drive propeller 106 by wheel 105, acting as a driving wheel when actuated by the wind, and also to drive said propeller along with said wheel by means of the engine. Suitable brake means for wheel 105 is preferably, also provided and may include companion brake members 107' normally clamping shaft 107 by suitable springs, and which are released by a lever 108' and wedge means 109' entering between members 107'.

The means for connecting and disconnecting the driving wheel 105 from the hand wheel 66 and from the engine, includes a bevel pinion 116 on shaft 107 driven by a bevel gear 117 on a shaft 118 rotatable in anti-friction bearings on frame 26 and strut 21. A bevel pinion 119 is mounted at the end of shaft 118, to slide thereon but rotate therewith, and is engageable with bevel gear 98, which may be driven by the hand wheel or by the engine by connecting pinion 97 with gear 98. A lever 121 is pivoted on the body and is connected with a link 122 to a lever 123 which is pivoted to a lug on strut 21 and has a forked part engaging in a groove in collar 124 on pinion 119, for connecting and disconnecting the drive wheel 105 and the engine.

It is apparent that by operating lever 121 the wheel 105 may be connected with and driven by the engine, and at the same time the gears 112 and 113 are disconnected by a pedal 114, thus using wheel 105 as a main drive wheel or propeller for driving the aeroplane; and it is also apparent that by disconnecting the engine from said wheel, and by connecting gears 112 and 113, through pedal 114, that wheel 105, which is automatically rotated or driven by the air currents or wind, will act and may be utilized as a wind driven wheel for driving the helicopter propeller 106, thereby buoying the aeroplane upward and retarding the fall thereof.

The movable wing means and operating means therefor comprise a pair of wings 125, one extending out from each side of the wing struts 21', and being placed below the stationary or main plane 25 (see Figs. 1, 4 and 12). Each wing is curved transversely, or in its forward and rearward direction, and is fastened with its intermediate part on a supporting bar 126 which is pivotally supported on the rounded forward end 127 of a supporting beam 128. This beam is pivotally supported on bearings and a pivot pin 129 in a bracket 130 provided on the side member of the body 20. These pivot elements 127 and 129 extend at right angles to each other and provide a compound and substantially universal motion to the plane.

The means for operating the wings includes a crank wheel or member 131 mounted at each end of cross shaft 99, and a bar or pitman 132 which is pivotally connected with said crank wheel and with a bracket 133 on bar 126. A spring 134 is connected to the free inner end of said bar and to the bottom of body 20, to provide resilient tilting or swinging movement of the wing on pivot 127, transversely of the aeroplane; while a spring 135 is fastened to the free rear end of beam 128 to provide resilient tilting or swinging movement of the wing on pivot pin 129 longitudinally of the aeroplane. The operation of shaft 99, assisted by springs 134 and 135, thus produces a compound swinging and tilting movement of the wings, which movement is greatest at the outer forward part of the wings, and is similar to the flapping movement of the wings of a bird.

The ground brake means comprises a brake bar 136 pivoted to a lug 137 under the body 20, and having pointed forks 138 engaging and entering the ground. A spring 139 normally raises the brake bar into an inoperative position, and a hand wheel 140 with a threaded shaft 141 is adjustable longitudinally in a threaded bracket 142 and is connected by a rod 143 with brake bar 136, for forcing forks 138 into the ground and assisting in raising said bar.

What I claim as new and desire to secure by Letters Patent is:

1. An aeroplane comprising a main and auxiliary propellers, engine control means for driving said main propellers or said auxiliary propellers, and manual means with control means for driving said auxiliary propellers and excluding said main propeller and engine.

2. An aeroplane provided at its front with a main tractor propeller and a pair of auxiliary tractor propellers, an engine geared to said main propeller for driving it, a hand wheel with speed increasing means for driving said auxiliary propellers, and a lever with means for connecting or disconnecting said hand wheel and auxiliary propellers to said engine and main propeller.

3. An aeroplane comprising tractor propellers and a wind driven propeller arrangeable for driving said tractor propellers, an engine and manual means for driving said propellers, and control means for connecting and disconnecting either said engine or said manual means with said propellers.

4. An aeroplane having main and auxiliary tractor propellers and a wind actuated driving propeller, hand operated means, and control means for operating some of said tractor propellers either by said hand means alone, or in conjunction with said wind actuated driving propeller.

5. An aeroplane having a helicopter propeller and a wind actuated driving propeller with connecting means, an engine and manual means for driving the propellers, and control means for connecting and using either said engine or said manual means for driving said propellers together or for excluding both said engine and said manual means and letting the wind drive both propellers.

6. An aeroplane comprising a tractor propeller and a wind actuated driving propeller arranged to drive said tractor propeller, an engine for driving one or both of said propellers, manual means for driving said tractor propeller, and control means for driving said tractor propeller by either said wind driven propeller or by said manual means or by both.

7. An aeroplane comprising tractor propellers and a wind actuated driving propeller arranged for driving said tractor propellers, an engine for operating said propellers, manual means for driving said propellers, and levers for connecting or disconnecting said propellers with said engine or said manual means or with both, or disconnect both the engine and means from said propellers and let the wind drive said propellers.

8. An aeroplane comprising a helicopter propeller, a driving propeller, and tractor propellers, an engine and manual means for operating said propellers, and lever means for connecting and disconnecting said engine and said manual means either separately or together to various propellers.

9. An aeroplane comprising movable wing means and propellers, an engine and manual means each arranged for driving said propellers and wing means, and control means movable for operating said propellers and wing means by said manual means, with said engine inoperative or disconnected, to avoid rapid dropping of the aeroplane.

10. An aeroplane comprising a tractor propeller and wing means, a wind actuated driving propeller arranged to drive said tractor propeller and said wing means, an engine for driving one or both of said propellers and said wing means, manual means for driving said tractor propeller and said wing means, and control means arranged for operating said tractor propeller and said wing means together by either said wind driven propeller or by said manual means or by both, to avoid rapid dropping of the aeroplane while said engine is inoperative or disconnected.

In testimony whereof I have signed my name to this specification.

ELIAS A. KAUFFMAN.